United States Patent Office.

CHARLES SAFFRAY, M. D., OF NEW YORK, N. Y.

Letters Patent No. 77,537, dated May 5, 1868; antedated April 25, 1868.

IMPROVED CEMENT.

The Schedule referred to in these Letters Patent and making part of the same.

TO ALL WHOM IT MAY CONCERN:

Be it known that I, CHARLES SAFFRAY, M. D., of the city, county, and State of New York, have invented a new and improved Cement, for roofing, facing, flooring, and decorating buildings, cars, ships, &c., lining cisterns, tanks, pipes, &c.; and I do hereby declare that the following is a full and exact description, to wit:

To make my cement, that I style "Diamond Cement," I take one gallon of boiled linseed-oil, and add to it half a pound of strained juice of onion or other plant of the genus "*Allium*," and boil it for three hours. I mix it with nine gallons of boiled linseed-oil, and keep for use that prepared oil. I mix forty-seven pounds of river sand with two pounds of oxide of calcium, one pound of oxide of iron, four pounds of protoxide of lead; then I add about half a gallon of the prepared oil, so as to give to the mass the consistency of stiff mortar. The cement thus formed is applied with a trowel or otherwise.

The peculiar constituents of the vegetable juice employed in preparing the oil impart to it the property of being rapidly oxidized, of becoming, when dry, a very adhesive substance, and of forming, with metallic oxides, oleates of a complex nature, which firmly bind together the particles of sand and other substances with which they are mixed, so that the whole mass becomes as hard as the best stone.

I wish it to be understood that the above proportions are not definite, and may be altered to suit the different purposes for which the cement should be made; that the composition may be altered in bulk, color, &c., by addition of almost any metallic or mineral substance or pigment. When spread, it may receive a finish by sanding, coloring, moulding, cutting, &c.

Having thus described my invention, what I claim, and desire to secure by Letters Patent, is—

The preparation of oil, as above described, for making cements, and an improved cement made of the above-named materials, bound together by the chemical action upon them of the oil so prepared, said cement to be applied to the uses specified.

CH. SAFFRAY, M. D.

Witnesses:
    EUGENE BADGLEY,
    WALTER R. BYNNER.